April 20, 1954 J. G. VUILLEMIN 2,675,830

FLUID DISTRIBUTING DEVICE

Filed Dec. 12, 1951 6 Sheets-Sheet 1

INVENTOR
Jean Georges Vuillemin
BY
Haseltine, Lake & Co.
Agents

April 20, 1954 J. G. VUILLEMIN 2,675,830

FLUID DISTRIBUTING DEVICE

Filed Dec. 12, 1951 6 Sheets-Sheet 2

INVENTOR
JEAN GEORGES VUILLEMIN
BY
Haseltine, Lake & Co.
AGENTS

INVENTOR
JEAN GEORGES VUILLEMIN
BY
Haseltine, Lake & Co.
AGENTS

April 20, 1954 J. G. VUILLEMIN 2,675,830

FLUID DISTRIBUTING DEVICE

Filed Dec. 12, 1951 6 Sheets-Sheet 4

INVENTOR

Jean Georges Vuillemin

BY

Haseltine, Lake & Co.

AGENTS

April 20, 1954 J. G. VUILLEMIN 2,675,830

FLUID DISTRIBUTING DEVICE

Filed Dec. 12, 1951 6 Sheets-Sheet 5

INVENTOR

JEAN GEORGES VUILLEMIN

BY

Haseltine, Lake & Co.

AGENTS

INVENTOR
JEAN GEORGES VUILLEMIN
BY
Haseltine, Lake & Co.
AGENTS

Patented Apr. 20, 1954 2,675,830

UNITED STATES PATENT OFFICE 2,675,830

FLUID DISTRIBUTING DEVICE

Jean Georges Vuillemin, Paris, France, assignor to Fonderies Debard, Paris, France, a society of France Application December 12, 1951, Serial No. 261,196

3 Claims. (Cl. 137—624)

This invention relates to a fluid distributing device and more particularly to a valve for distributing a gaseous fluid to a plurality of devices.

In the following description, it will be supposed that the apparatus is intended to distribute air under pressure, but it should be well understood that it might be used to distribute a liquid under pressure or to subject a plurality of devices distributively to the effect of a suction.

Its object is to provide an apparatus of this kind which is better adapted to meet the requirements of practice than those known at the present time.

Preferred embodiments of my invention will be hereinafter described with reference to the accompanying drawings, given merely by way of example, and in which.

Figure 2:
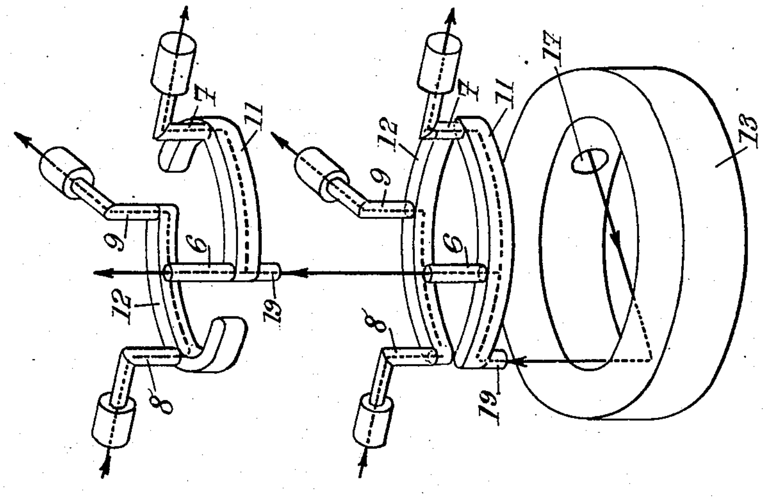
Fig. 2 is a perspective diagrammatical view showing the respective positions of the main elements corresponding to the first and last stages of the slide valve apparatus of Fig. 1.
Figure 19:
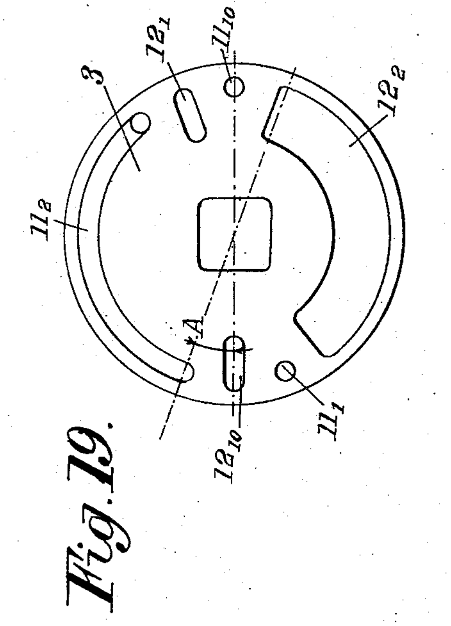
Figure 20:
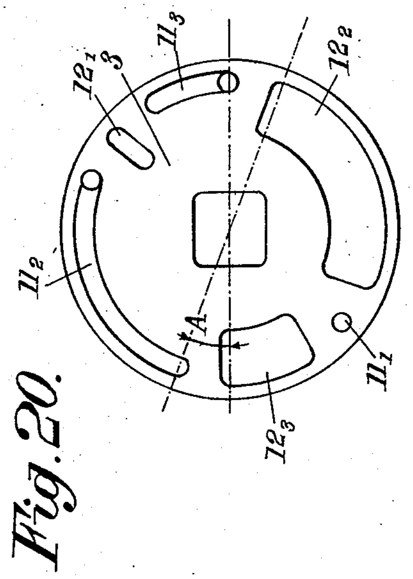
Figure 13:
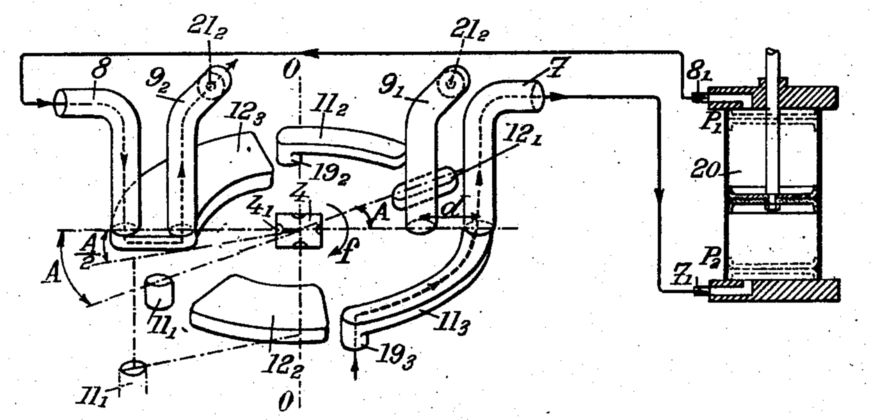
Figure 14:
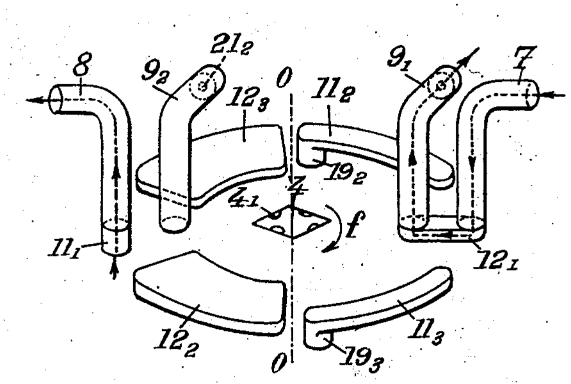
Figure 15:
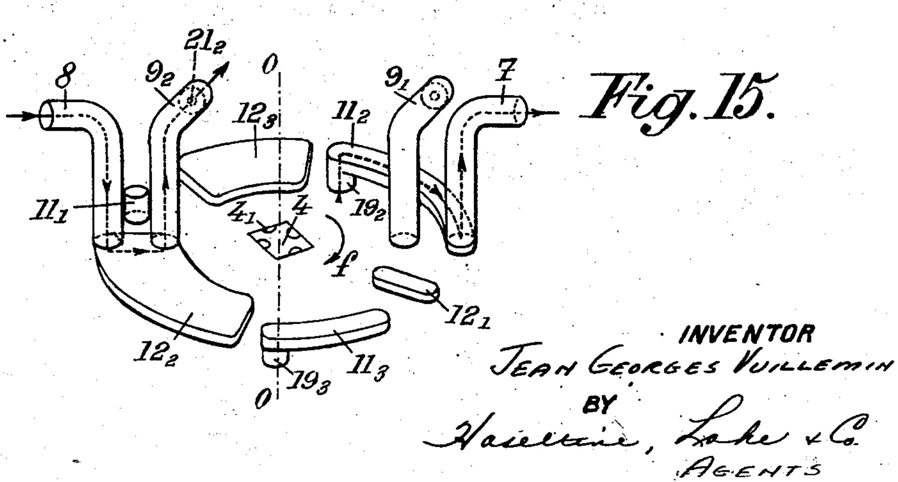
Figure 16:
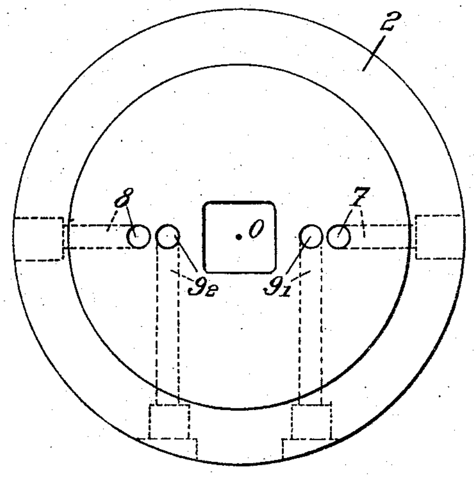
Figure 17:
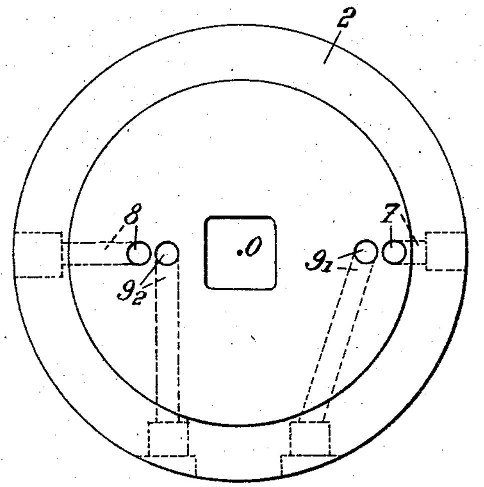
Figure 18:
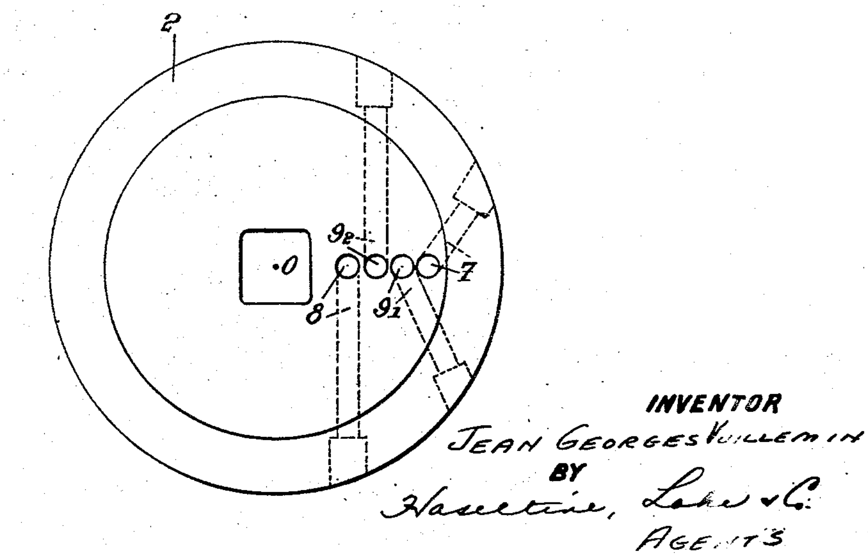

Figs. 13 to 15 diagrammatically show, in a way similar to that of Fig. 2, the relative arrangement of the parts in an apparatus according to Fig. 2, these three figures corresponding respectively to three different working positions of the valve;

Fig. 16 is a diagrammatic view of a fixed disc element in an apparatus of the kind of that shown by Figs. 12 to 15;

Figs. 17 and 18 are views similar to Fig. 16 but corresponding to modifications;

Figs. 19 and 20 show, in plan view, one rotary ring element for use in an apparatus of this kind, according to two other modifications.

It has proved very advantageous in practice to control various devices by means of pneumatic impulses. By way of example, metallic molding devices may be controlled in this way by acting successively on different mold components, for instance on the side walls, the cores, the extractor means, etc. Semi-automatic machining systems may also advantageously be controlled in this way, same as sand blasting plants, and so on.

Such a pneumatic control is advantageously carried out by means of a multiple stage slide valve according to my invention.

This valve is obtained by the juxtaposition of several stages of distribution, each intended to control a predetermined operation, for instance, as it will be hereinafter supposed, by means of a jack (such a jack is shown at 20 in Fig. 13).

Figure 1:
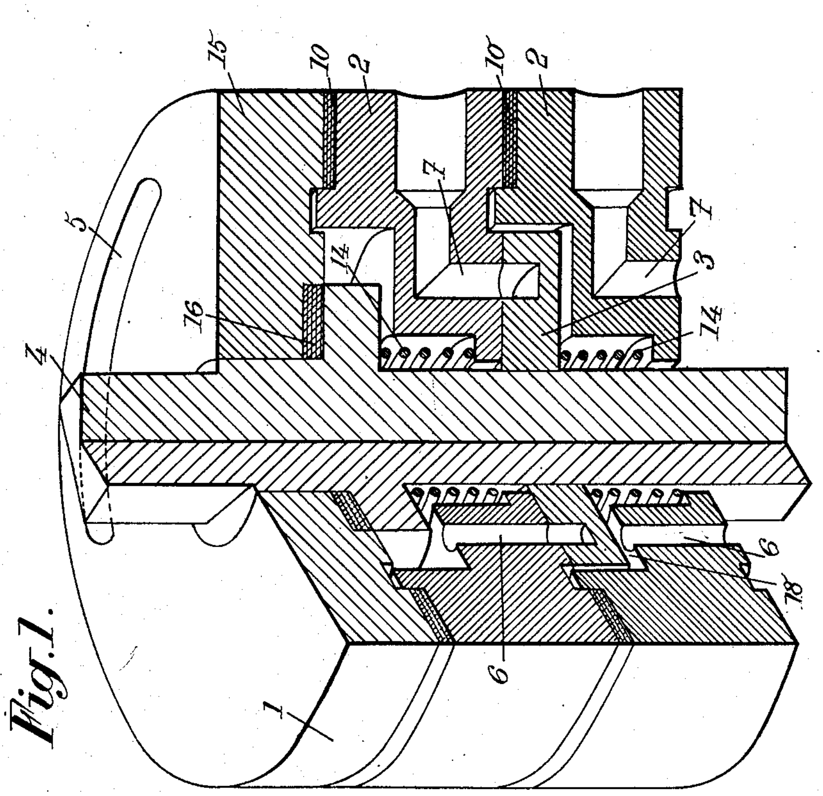
Fig. 1 is a perspective view, with portions cut away, of the upper part of a five stage pneumatic slide valve apparatus according to the invention.
Figure 8:
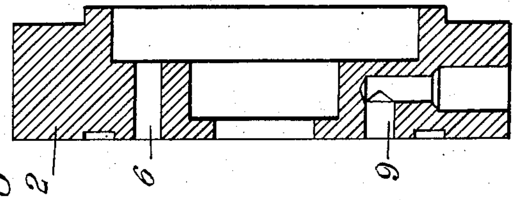
Figs. 6, 7 and 8 are, respectively, a plan view and two sectional views on the lines VII—VII and VIII—VIII of Fig. 6 of a fixed disc element of the same slide valve.
Figure 6:
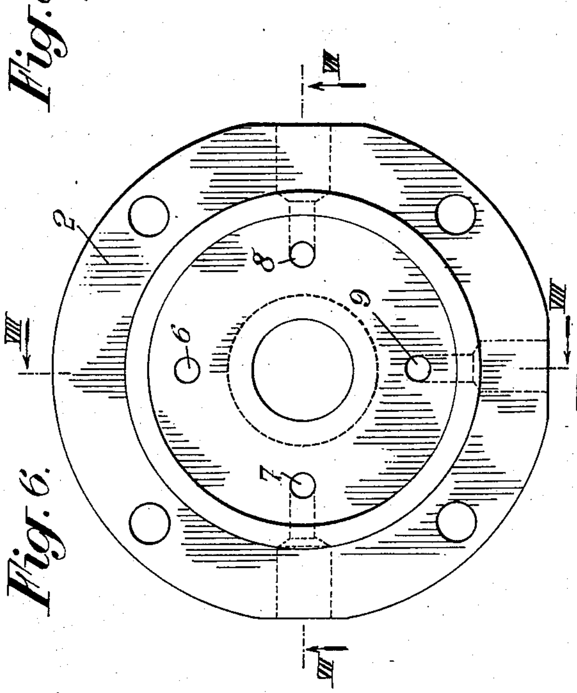
Figure 7:
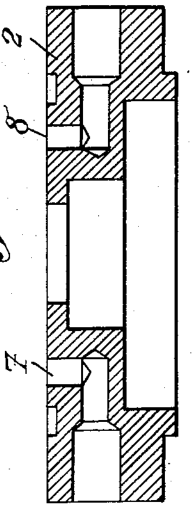
Figure 5:
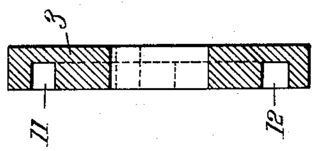
Figs. 3, 4 and 5 are, respectively, a plan view and two sectional views on the lines IV—IV and V—V of Fig. 3 of a rotary ring element of the slide valve.
Figure 4:
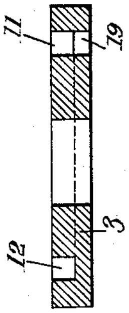
Figure 3:
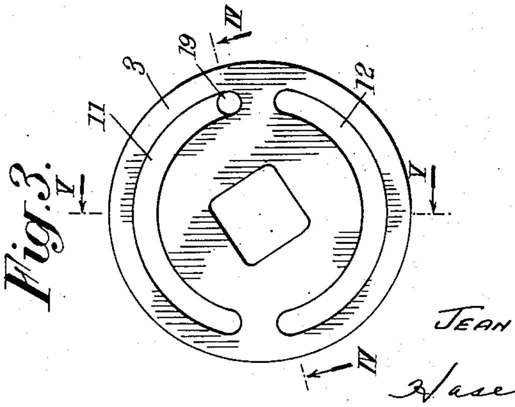

Every stage is essentially constituted by the two following elements:

A fixed element, rigid with the body 1 of the apparatus (which is constituted mainly by the assembly of these fixed elements); preferably, this fixed element is a circular disc 2, as shown by Figs. 1 and 13;

A sliding element constituted by a rotary ring 3 fixed to a rod 4 extending through body 1. This rod or shaft 4 is rotatable in body 1, with an amplitude limited, in the construction illustrated by Figs. 1 to 11, by abutments constituted by the ends of a groove 5 in the form of a circular arc provided at the top of body 1. A free space 18, constantly fed with compressed air, is provided under every rotary ring element, this space extending over the whole circumference of this ring.

Every fixed disc element 2 is provided with four compressed air passages 6, 7, 8, 9. Passage 6 extends vertically throughout the disc element, opening at the top into the above mentioned space 18. These passages serve to supply compressed air to the respective stages of the valve. Passage 7 is in communication with one of the ends of the jack operated through the stage to which belongs the disc element. Passage 8 communicates with the other end of this jack. Passage 9 opens to the atmosphere and serves to exhaust the compressed air.

Preferably, these passages are similarly disposed in the respective stages, so that the corresponding passages of the different stages are located above one another.

A packing joint 10 (for instance of greased leather) is interposed between every two consecutive disc elements 2.

The rotary ring elements 3 are provided, in their upper faces, with two grooves 11 and 12 in the form of circular arcs. These curved grooves 11 and 12 have a radius equal to the distance of the vertical portions of passages 6, 7, 8 and 9 from the axis of the apparatus so that said grooves can cooperate with said passages. Furthermore, every rotary ring element 3 is provided with a hole or passage 19 extending throughout it (in a direction parallel to its axis) and opening into groove 11.

All these rotary ring elements 3 are advantageously identical to one another, but they are fixed in different relative angular positions on spindle 4.

The angle between the respective positions of two consecutive rotary ring elements is chosen in accordance with the conditions under which the valve apparatus is to operate. For practical purposes, it seems advantageous to provide the same angle between the positions of every two consecutive ring elements. With a construction such as that shown by Figs. 1 to 11, for a valve having a diameter of about 10 centimetres, it was found that 15° is a satisfactory value of this angle, the vertical portions of passages 6, 7, 8, 9 being in planes at 90° from each other and the amplitude of rotation of spindle 4 being limited to 90°.

The elements of the multiple stage valve being made as above stated are assembled by piling up, on a base element 13, alternately one fixed disc element 2 and one rotary ring element 3, and so on, every ring element being applied against the corresponding fixed disc element by elastic means such as a spring 14. In order to have the rotary ring elements disposed at the desired angle to one another, spindle 4 is made of square section and the ring elements are provided, at the center thereof, with corresponding square holes, each disposed at the suitable angle to the grooves 11 and 12 of said ring element.

At the top of the structure thus obtained is placed a top element 15, suitable packing means 16, advantageously made of greased leather being provided to achieve fluidtightness. Preferably, air from a tank is admitted into base element 13 through a hole 17, and the air stream flows from one stage to the next one through passages 19.

Figures 9, 10, 11:
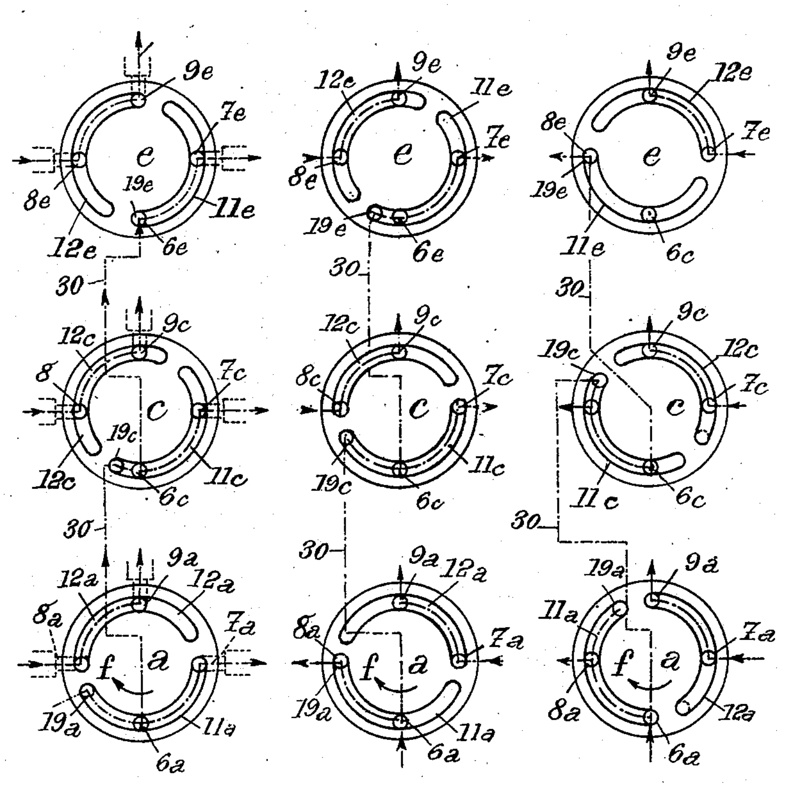
Figs. 9, 10 and 11 are diagrammatic explanatory views showing the positions of the parts in the first, second and fifth stages of the slide valve, respectively for the first, the third and the last position of said slide valve.

This slide valve apparatus works in the following manner, more especially illustrated by Figs. 9 to 11:

In the first working position of the valve apparatus, shown by Fig. 9, the air flowing in through 19*a* into the groove 11*a* of the ring element 3*a* of the first stage *a* is led through this groove to passage 7*a* leading to one of the ends of the jack operated by stage *a*.

Furthermore, air also passes from groove 11*a* into the passage 6*a* of the fixed disc element cooperating with said ring element 3*a* (this disc element is not shown on Fig. 9, but the passages 6*a*, 7*a*, 8*a* and 9*a* thereof have been shown).

Through passage 6*a*, air can flow into the space (18*a*) between said disc element and the ring element immediately above it. It then passes through the hole 19*b* of this ring and the passage 6*b* of the corresponding disc (these elements are not visible on Figs. 9, 10 and 11 because only three stages, to wit the first, the third and the fifth one, respectively designated by *a*, *c* and *e*, have been shown, whereas the second and fourth ones, which would therefore be designated by *b* and *d*, are not shown). Thence, air flows through the hole 19*c* of the ring element of the third stage and the passage 6*c* of the corresponding disc element. Finally, the air stream, the path of which is diagrammatically indicated by the dot-and-dash line 30 flows through the four first stages and reaches the fifth stage through hole 19*e*.

It is pointed out that the groove 11 of every ring element 3, which communicates with the space 18 under said ring, is always in communication with the passage 6 of the disc element 2 cooperating with said ring element 3, said passage 6 leading to the space 18 above said disc element, whereby air can always flow in series through the successive stages.

Reverting now to the stage *a* in the position shown by Fig. 9, the jack corresponding to this stage is supposed to be a double acting jack having one end connected with conduit 7*a* and the opposite end connected with conduit 8*a*. When said jack is operated by compressed air fed through conduit 7*a*, it expels the air it contained into conduit 8*a*. This air flows through the groove 12*a* of ring element 3*a* into exhaust passage 9*a* opening into the atmosphere.

In the other stages, and as illustrated for the third and fifth one (*c* and *e*), the operation is the same. For instance, for stage *c*, air flows in through hole 19*c* into groove 11*c*, and thence through passage 7*c*, thus actuating the corresponding jack. The air expelled therefrom passes through 8*c*, 12*c* and 9*c* to the atmosphere.

Thus the jacks corresponding to the five stages are operated in given directions. To simplify explanations, it will be said that they are driven in the same direction.

If now, the ring elements of the valve are all rotated through an angle of 15° in the clockwise direction (arrow *f*), the only stage in which air distribution is modified is the first stage or stage *a*. A rotation of 15° causes the right hand end of groove 11*a* to be no longer in communication with passage 7*a*. But it does not yet bring the other end of said groove 11*a* to communicate with passage 8*a* (the angular interval between said left hand end of groove 11*a*, which coincides with 19*a*, and passage 8*a* is 30°). Therefore, neither one end nor the other of the jack controlled by stage *a* is in communication with the source of air under pressure. For the other stages, the operation is the same as that described with reference to Fig. 9.

If now a further rotation of 15° is imparted to the ring elements in the clockwise direction, the parts come into the position shown by Fig. 10. In stage *a*, groove 11*a* has come into communication with passage 8*a*, while groove 12*a* has come into communication with passage 7*a*, whereby the jack controlled by stage *a* is driven into the position opposed to that it had in the case of Fig. 9. For the third, fourth (not shown) and fifth stages, the distribution is not changed and the jacks remain in the positions they had before. But, for the second stage (not shown), the corresponding jack has both of its ends cut off from the source of air under pressure.

Therefore, a third rotation of 15° will bring the parts into positions (not shown) such that while the distribution conditions remain the same for the first, third, fourth and fifth stages, they are reversed for the second stage.

A fourth rotation of 15° will cause the distribution conditions to be reversed in the third stage, while leaving them unchanged in the other stages. On the fifth rotation it is the fourth stage which reverses the feed to its jack. Finally, at the end of the sixth rotation (the total rotation being now 90°), the parts are in the position shown in Fig. 11. Groove 11e has been in turn placed in communication with passage 8e, thus reversing the feed to the jack corresponding to this stage e. All the jacks are now being fed in directions opposed to those corresponding to Fig. 9.

If now the valve (i. e. the set of ring elements) is rotated in the opposed direction, the same conditions as above described are obtained for the successive positions of said valve.

The speed of operation of the jack (or jacks) of every stage may be adjusted through any suitable means, for instance by fitting in the conduits communicating with passages 7 and 8 plugs provided with holes of given diameters.

The advantages of a valve such as above described are essentially that it is of strong construction, easy to manufacture and to operate, and adaptable to many different systems.

Figs. 12 to 20 show modifications of my invention arranged so that rotation of the moving portion of the valve always in the same direction makes it possible to operate at least some of the jacks first in one direction and then in the other.

In the embodiment of my invention above described with reference to Figs. 1 to 11, the jacks are successively operated in one direction as the set of ring elements is rotated in one direction through an angle of 90° and these jacks may be successively operated in the opposed direction by rotating the set of ring elements in the opposed direction through the same angle, i. e. by returning this set of elements to its initial position through a movement which is the reverse of the first one. The embodiments of my invention which are now to be described make it possible to reverse the operation of the jacks without reversing the movement of the moving part of the valve, whereby rotation of one ring element always in the same direction makes it possible to obtain several to and fro cycles of operation of the corresponding jack.

For this purpose, in the construction of Figs. 12 to 15, one fixed disc element, taken by way of example, is provided, instead of a single exhaust passage 9 as shown by Fig. 2, with two exhaust passages $9_1$ and $9_2$ associated respectively with the passages 7 and 8 leading to the ends $7_1$ and $8_1$ of the corresponding jack 20.

The two pairs of conduits 7—$9_1$ and 8—$9_2$ are advantageously disposed on either side of the axis of the disc element, in a radial plane thereof.

The corresponding ring element (the ring elements are not fully shown in Figs. 13 to 15, which only show their passages and grooves) is provided with grooves some of which, such as $12_1$, $12_2$, $12_3$, are radially of a width greater than the distance d between the two elements of each pair 7—$9_1$ and 8—$9_2$, and serve to the exhaust of air.

The intake of air, conduits 7 and 8 being disposed, in the construction of Figs. 13 to 15, at the same distance from the axis, is obtained through other channels or grooves $11_1$, $11_2$, $11_3$ of smaller radial width, communicating either directly or through passages such as $19_2$, $19_3$ with the interval 18 (Fig. 12) existing between two fixed disc elements, which interval is constantly in communication with the source of compressed air.

In the construction shown, a passage $11_1$, located at the same distance from the axis as radial passages 7 and 8, and a radial groove $12_1$ are located in the same diametral plane. The other grooves $11_2$, $11_3$ and $12_2$, $12_3$ are disposed on either side of this plane (with any suitable arrangement according to the operation to be obtained).

This device works as follows:

In the position of Fig. 13, air is admitted toward the end $7_1$ of jack 20 through passage $19_3$, groove $11_3$ and conduit 7. Air is driven out from the end $8_1$ of the jack through conduit 8, groove $12_3$ and exhaust conduit $9_2$. The jack comes into the position shown in dotted lines at $P_1$.

If now, the ring element is rotated in direction f through an angle A into the position shown by Fig. 14, the end $7_1$ of jack 20 is connected through conduit 7 and groove $12_1$ with the exhaust conduit $9_1$, whereas air under pressure is admitted through passage $11_1$ and conduit 8 to the end $8_1$ of the jack, which comes into position $P_2$.

If the ring element is further rotated in the same direction f into the position of Fig. 15, air is again admitted to the end $7_1$ of the jack through passage $19_2$, groove $11_2$ and conduit 7, whereas air escapes from the end $8_1$ of the jack through conduit 8, groove $12_2$ and exhaust conduit $9_2$. The jack is returned to position $P_1$.

Thus, two successive rotations of the valve moving ring in the same direction have produced inverse operations of the jack.

Furthermore, the arrangement above described with reference to Figs. 13 to 15 makes it possible to increase the number of successive positions of operation of the valve. Fig. 13 shows that angle A may be chosen equal to about 20°. On the other hand, the angular offsetting between two consecutive stages may be chosen equal to A/2, that is to say 10° if it is supposed that the grooves, or at least some of them, are similarly disposed in the respective stages. Now Fig. 13, where the passage $11_1$ of the next stage has been shown in dotted lines, in a plane making an angle of 10° with that of the passage $11_1$ of the stage that is being considered, shows that the fact of imparting to the set of movable ring elements an angular displacement of 10° makes it possible to operate the jack corresponding to said next stage without yet changing the operation in the stage shown by Fig. 13.

Consequently, it is possible to provide eighteen or at least seventeen different angular positions of operation over an angle of rotation of 180° for practically the same volume of the apparatus as in the construction of Figs. 1 to 11.

According to the value of angle A, the number of different positions may be different, and even higher than that above mentioned.

Figs. 19 and 20 show, by way of example, two arrangements of the grooves in the ring elements different from that above described. It is apparent from these figures that, for certain of the successive positions of movable ring 3, shifting is obtained with a rotation A variable in accordance with the values of the diameter of the ring and of that of conduits 7, 8 and 9.

It should be noted that, in the construction of Figs. 12 to 15, which involves the use of fixed disc elements 2 made as shown by Fig. 16, where conduits 7 and 8 and also $9_1$ and $9_2$ are at the same distances from the central axis O, the useful cycle of operation of the valve is completed at the end of a rotation of 180°. If the valve is further rotated beyond this position, through another 180°, while keeping open the feed of fluid under pressure, the same successive operations as in the useful cycle of operation are obtained, but in opposed directions, which is not desirable. It is therefore advisable, during this further rotation of 180°, to stop the inflow of power fluid, for instance by means of a supplementary ring 3 which controls the whole. The normal cycle is then repeated.

But it is also possible, according to my invention, to obtain a useful cycle of 360°, by disposing the active ends of conduits 7, 8 or $9_1$, $9_2$ on fixed discs 2 no longer at the same distances from axis O but at difference distances, for instance: either still on either side of said axis O (Fig. 17), or on the same side thereof (Fig. 18).

Another advantage of the arrangements described with reference to Figs. 12 to 18 lies in the fact that it is possible to obtain speeds of operation of the jacks which are different for the two directions of operation thereof.

It suffices for this purpose to provide in exhaust conduits $9_1$ and $9_2$ fluid flow braking means exerting different actions, for instance, as shown by Fig. 13, plugs or partitions provided with orifices $21_1$ and $21_2$ of different diameters. I might also make use of variable flow valves, thus ensuring an easy adjustment of the speed of operation, which valves may be driven either manually or automatically by a safety device or again by the displacement of the part that is being controlled, whereby automatic adjustment of the speed of operation of this part is obtained.

Of course, such means might be provided otherwise than in conduits $9_1$, $9_2$.

Figure 12:
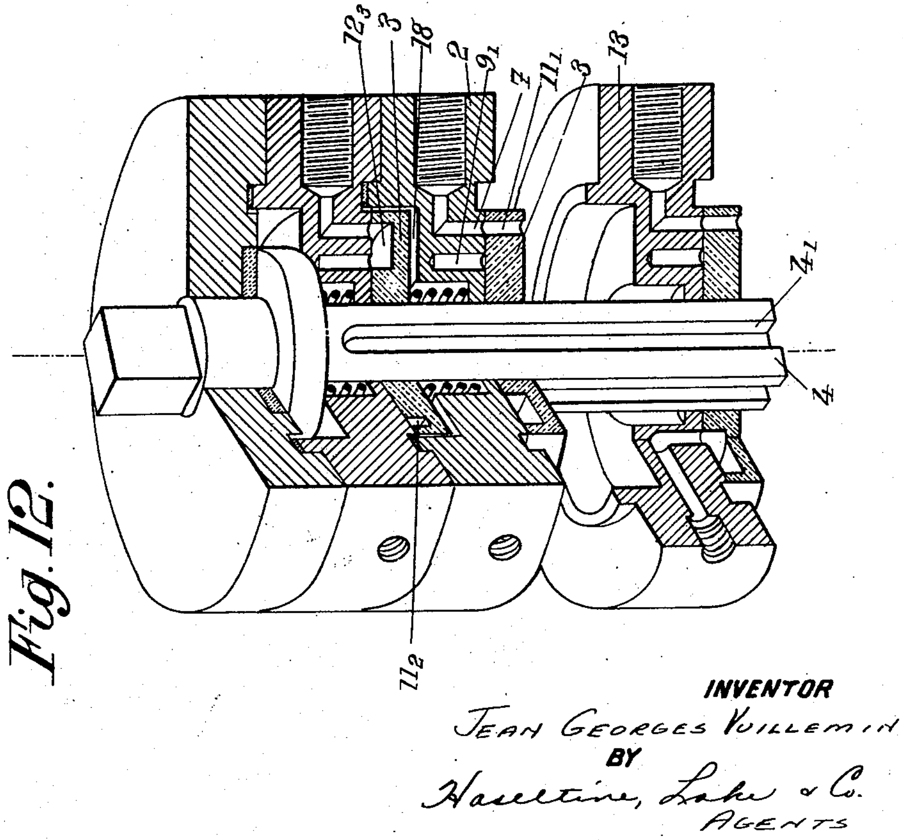
Fig. 12 is a perspective view, with portions cut away, similar to Fig. 1 but relating to a modification.

The different rings may be mounted as above described with reference to Fig. 1, i. e. by fitting them on a driving shaft or spindle 4 of square cross section. Instead of obtaining the flow of air under pressure from one stage to the next one through passages 6 provided in the fixed discs, as in the construction of Figs. 1 to 11, it seems simpler, as shown by Fig. 12, to make use of feed grooves $4_1$ provided in said shaft 4.

The apparatus may advantageously be provided with means for marking the different positions of the moving portion of the valve, rigid with shaft 4, said means including for instance pawl or equivalent devices in combination with a pointer movable with respect to a mark. The valve may be operated either manually or automatically by means of any servo-motor which keeps the moving portion of said valve in any of its working positions for a predetermined and adjustable time in accordance with the operations to be performed by the jacks or other devices controlled by the valve.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. Apparatus of the valve type for distributing a fluid under pressure to a plurality of hydraulic devices, said apparatus comprising a plurality of fixed plates clamped in superposed relationship, each of said plates having peripheral inlet and outlet ports in communication with one of said hydraulic devices and also having a peripheral exhaust duct, said fixed plates being separated by interior chambers, means permanently communicating each of said chambers with an adjacent chamber and a source of fluid pressure whereby the pressure in said chambers remains constant, distributing rings mounted on a rotary shaft so as to rotate in said chambers, means resiliently pressing said rings against said fixed plates in the direction of flow from said source of fluid pressure, said distributing rings having arcuate grooves and passages at right angles to said grooves therein, for establishing communication between said source of fluid pressure and said outlet ports and between said inlet ports and said exhaust ports.

2. Apparatus as set forth in claim 1 wherein said means permanently communicating each of said chambers comprises passages extending through each of said fixed plates and each of said rotary rings in constant mating relationship.

3. Apparatus as set forth in claim 1 wherein said means permanently communicating each of said chambers comprises a groove extending in an axial direction along said shaft.

References Cited in the file of this patent

UNITED STATES PATENTS

| Number | Name | Date |
| --- | --- | --- |
| 1,282,649 | Stevens | Oct. 22, 1918 |
| 2,435,338 | Booth | Feb. 3, 1948 |
| 2,509,880 | Pelton | May 30, 1950 |
| 2,600,099 | Betrez | Jan. 10, 1952 |

FOREIGN PATENTS

| Number | Country | Date |
| --- | --- | --- |
| 646,259 | France | Nov. 9, 1928 |
| 602,890 | Great Britain | June 4, 1948 |